(12) United States Patent
Yamanaka (10) Patent No.: US 10,889,010 B2
(45) Date of Patent: *Jan. 12, 2021

(54) GRASPING MECHANISM AND GRASPING DEVICE

(71) Applicant: OLYMPUS CORPORATION, Tokyo (JP)

(72) Inventor: Noriaki Yamanaka, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 395 days.

This patent is subject to a terminal disclaimer.

(21) Appl. No.: 15/801,356

(22) Filed: Nov. 2, 2017

(65) Prior Publication Data

US 2018/0050456 A1  Feb. 22, 2018

Related U.S. Application Data

(63) Continuation of application No. PCT/JP2016/065611, filed on May 26, 2016.

(30) Foreign Application Priority Data

May 29, 2015 (WO) .................. PCT/JP2015/065633

(51) Int. Cl.
*B25J 15/08* (2006.01)
*B25J 15/02* (2006.01)

(52) U.S. Cl.
CPC ........... *B25J 15/08* (2013.01); *B25J 15/0233* (2013.01)

(58) Field of Classification Search
None
See application file for complete search history.

(56) References Cited

U.S. PATENT DOCUMENTS

| 5,507,773 A | 4/1996 | Huitema et al. |
| 5,562,700 A | 10/1996 | Huitema et al. |
| 5,562,701 A | 10/1996 | Huitema et al. |
| 5,562,702 A | 10/1996 | Huitema et al. |

(Continued)

FOREIGN PATENT DOCUMENTS

| EP | 0668057 A2 | 2/1995 |
| EP | 0800792 A1 | 10/1997 |

(Continued)

OTHER PUBLICATIONS

International Search Report dated Aug. 9, 2016 issued in PCT/JP2016/065611.

(Continued)

*Primary Examiner* — Michael S Lowe
(74) *Attorney, Agent, or Firm* — Scully, Scott, Murphy & Presser, P.C.

(57) ABSTRACT

A grasping mechanism including a first grasping piece and a second grasping piece that are coupled with each other so as to be pivotable about a pivoting axis, a pulling pulley that is supported by the second grasping piece so as to be rotatable about a rotation axis parallel to the pivoting axis, and a wire whose distal end is secured to one grasping piece and that is wound around the pulling pulley so that a resultant force of tensile forces on both sides of the pulling pulley flanking the rotation axis generates a rotational moment about the pivoting axis in a closing direction of the second grasping piece.

3 Claims, 12 Drawing Sheets

(56) References Cited

U.S. PATENT DOCUMENTS

| | | |
|---|---|---|
| 6,206,903 B1 | 3/2001 | Ramans |
| 6,896,704 B1 | 5/2005 | Higuchi et al. |
| 7,316,681 B2 | 1/2008 | Madhani et al. |
| 8,333,780 B1 | 12/2012 | Pedros et al. |
| 10,016,207 B2 * | 7/2018 | Suzuki ............... A61B 34/70 |
| 10,343,291 B2 * | 7/2019 | Jogasaki ............ B25J 15/0233 |
| 2002/0040217 A1 | 4/2002 | Jinno |
| 2004/0267406 A1 | 12/2004 | Jinno |
| 2006/0167589 A1 | 7/2006 | Jinno |
| 2007/0288044 A1 | 12/2007 | Jinno et al. |
| 2008/0039255 A1 | 2/2008 | Jinno et al. |
| 2008/0232932 A1 | 9/2008 | Jinno |
| 2009/0110533 A1 | 4/2009 | Jinno |
| 2009/0112229 A1 | 4/2009 | Omori et al. |
| 2009/0112230 A1 | 4/2009 | Jinno |
| 2010/0198253 A1 | 8/2010 | Jinno et al. |
| 2012/0239011 A1 | 9/2012 | Hyodo et al. |
| 2015/0025571 A1 | 1/2015 | Suzuki et al. |
| 2017/0135710 A1 | 5/2017 | Hasegawa et al. |
| 2018/0050456 A1 | 2/2018 | Yamanaka |
| 2019/0059922 A1 | 2/2019 | Yamanaka |
| 2019/0231374 A1 | 8/2019 | Kimura et al. |

FOREIGN PATENT DOCUMENTS

| | | |
|---|---|---|
| EP | 1 195 151 A1 | 4/2002 |
| EP | 1854418 A1 | 11/2007 |
| EP | 1886630 A2 | 2/2008 |
| EP | 2077095 A2 | 7/2009 |
| EP | 2666429 A1 | 11/2013 |
| EP | 2837341 A1 | 2/2015 |
| EP | 3263053 A1 | 1/2018 |
| FR | 1500906 A | 11/1967 |
| JP | H01-199777 A | 8/1989 |
| JP | 2000325375 A | 11/2000 |
| JP | 2002-103255 A | 4/2002 |
| JP | 2002102248 A | 4/2002 |
| JP | 2007301692 A | 11/2007 |
| JP | 2008-036793 A | 2/2008 |
| JP | 2009-106606 A | 5/2009 |
| JP | 2009-107095 A | 5/2009 |
| JP | 2009107087 A | 5/2009 |
| JP | 2010-221329 A | 10/2010 |
| JP | 2010227331 A | 10/2010 |
| JP | 2010-253162 A | 11/2010 |
| JP | 2012187311 A | 10/2012 |
| JP | 2013-215502 A | 10/2013 |
| WO | 2009/057347 A1 | 5/2009 |
| WO | 2010090292 A2 | 8/2010 |
| WO | 2010/126129 A1 | 11/2010 |
| WO | 2013/154157 A1 | 10/2013 |
| WO | 2016/136676 A1 | 9/2016 |
| WO | 2016/194067 A1 | 12/2016 |
| WO | 2016/194777 A1 | 12/2016 |
| WO | 2017/195246 A1 | 11/2017 |

OTHER PUBLICATIONS

International Search Report dated Aug. 18, 2015 issued in PCT/JP2015/065633.

International Search Report dated Aug. 2, 2016 issued in PCT/JP2016/063728.

International Search Report dated Jan. 31, 2017 issued in PCT/JP2016/085237.

German Office Action dated Mar. 13, 2019 in German Patent Application No. 11 2016 001 915.7.

International Search Report and the Written Opinion dated Aug. 9, 2016 received in related International Application No. PCT/JP2016/065962.

Japanese Office Action dated Jul. 21, 2020 in Japanese Patent Application No. 2017-521884, together with English language translation.

* cited by examiner

GRASPING MECHANISM AND GRASPING DEVICE

CROSS-REFERENCE TO RELATED APPLICATIONS

This is a continuation of International Application PCT/JP2016/065611 which is hereby incorporated by reference herein in its entirety.

This application is based on International Application PCT/JP2015/065633, the contents of which are incorporated herein by reference.

TECHNICAL FIELD

The present invention relates to a grasping mechanism and a grasping device.

BACKGROUND ART

In the related art, with grasping mechanisms that grasp an object such as biological tissue by means of a pair of grasping pieces coupled with each other in a pivotable manner, there are known mechanisms utilizing a toggle mechanism (for example, see Patent Literature 1). The toggle mechanism is provided with a pair of linkages coupled with each other so as to be pivotable about a pivoting axis that is shared with the pair of grasping pieces, and thus, the opening operation of the pair of linkages is converted to the closing operation of the pair of grasping pieces. In this structure, it is possible to increase the grasping force exerted by the pair of grasping pieces in accordance with the lengths of the pair of linkages.

CITATION LIST

Patent Literature

{PTL 1} Japanese Unexamined Patent Application, Publication No. 2007-301692

SUMMARY OF INVENTION

A first aspect of the present invention is a grasping mechanism including a first grasping piece; a second grasping piece that arranged side by side with the first grasping piece and that is coupled therewith so as to be pivotable about a pivoting axis that intersects the arrangement direction with respect to the first grasping piece so that first-end sides are opened and closed; a pulling pulley that is supported by the second grasping piece so as to be rotatable about a rotation axis that is parallel to the pivoting axis; and a wire that has a distal end secured to one of the first grasping piece and the second grasping piece and a proximal end that is disposed farther on a second-end side than the second grasping piece is, and whose distal-end portion is wound around the pulling pulley, wherein, the wire is wound around the pulling pulley so that tensile forces that act in substantially the same directions are generated in the wire on both sides of the pulling pulley flanking the rotation axis when the proximal end of the wire is pulled, and so that a resultant force of the tensile forces that act on the rotation axis of the pulling pulley generates a rotational moment about the pivoting axis in the closing direction of the second grasping piece.

DESCRIPTION OF EMBODIMENT

A grasping mechanism and a grasping device provided with the grasping mechanism according to an embodiment of the present invention will be described below with reference to the drawings.

Figure 1:
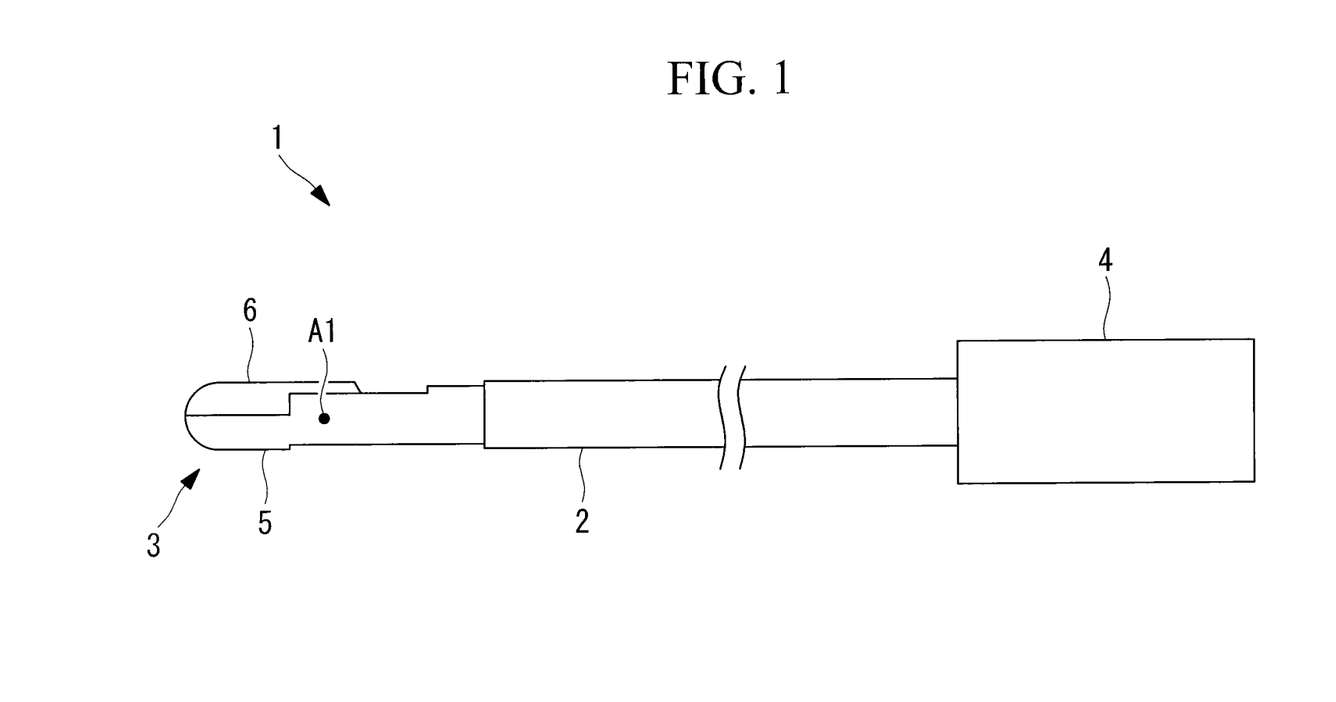
FIG. 1 is an overall configuration diagram of a grasping device according to an embodiment of the present invention.

A grasping device 1 according to this embodiment is medical instrument having a function for grasping biological tissue, like grasping forceps. As shown in FIG. 1, the grasping device 1 is provided with an elongated body portion 2 that can be inserted into a body, a grasping mechanism 3 that is provided at a distal end of the body portion 2, and a driving portion 4 that is connected to a proximal end of the body portion 2.

Figure 2:
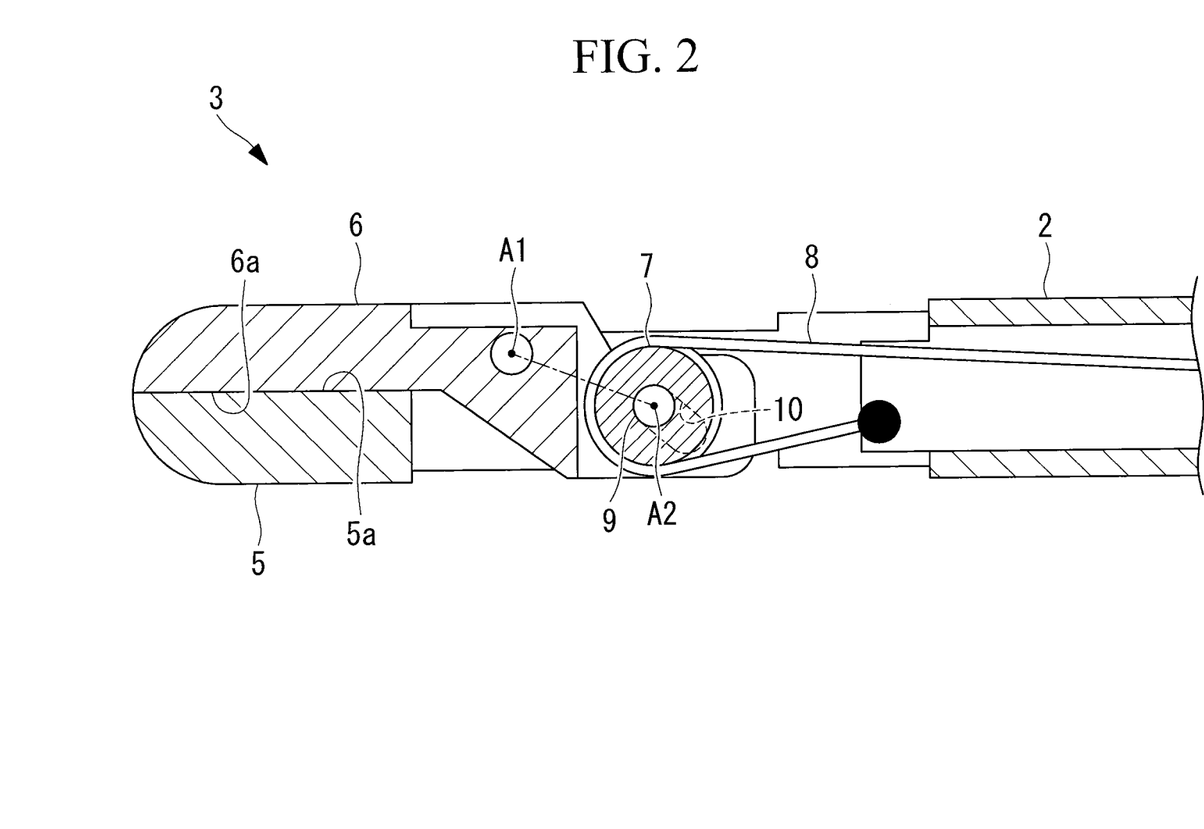
FIG. 2 is a longitudinal sectional view of a distal-end portion of the grasping device in FIG. 1, showing a grasping mechanism in the closed state.

As shown in FIG. 2, the grasping mechanism 3 is provided with a first grasping piece 5, a second grasping piece 6 that is coupled with the first grasping piece 5 in a pivotable manner, a pulling pulley 7 that is supported by the second grasping piece 6, and a wire 8 that generates a grasping force in the second grasping piece 6 via the pulling pulley 7. FIG. 2 shows a closed state in which the first grasping piece 5 and the second grasping piece 6 are closed and the wire 8 is not pulled by the driving portion 4.

The first grasping piece 5 is integrally formed with a cylindrical sheath that constitutes the main unit of the body portion 2.

The first grasping piece 5 has a first grasping surface 5a on a distal-end side thereof, and the second grasping piece 6 has a second grasping surface 6a on a distal-end side thereof. The first grasping piece 5 and the second grasping piece 6 are individually disposed in directions along the longitudinal axis of the body portion 2, and are arranged side-by-side so that the grasping surfaces 5a and 6a face each other. In the following, the direction in which the first grasping piece 5 and the second grasping piece 6 are arranged will be defined as the top-to-bottom direction, the first grasping piece 5 side will be defined as the bottom side, and the second grasping piece 6 side will be defined as the top side.

Farther on the proximal-end side than the first grasping surface 5a and the second grasping surface 6a are, the second grasping piece 6 is coupled with the first grasping piece 5 by means of a hinge so as to be pivotable about a pivoting axis A1 that is orthogonal to the top-to-bottom direction and the longitudinal axis of the body portion 2. When the second grasping piece 6 is pivoted about the pivoting axis A1, distal-end sides of the first grasping piece 5 and the second grasping piece 6 are opened and closed.

The pulling pulley 7 has a shaft 9 that is coaxially formed with a rotation axis A2 of the pulling pulley 7. The second grasping piece 6 has a slot 10 that is formed so as to have a depth in a direction parallel to the pivoting axis A1 and so as to substantially radially extend toward the proximal-end side and the bottom side with respect to the pivoting axis A1. The shaft 9 is inserted into the slot 10, thereby the pulling pulley 7 is supported by the second grasping piece 6 so as to be rotatable about the rotation axis A2, which is parallel to the pivoting axis A1, and so as to be movable along the longitudinal direction of the slot 10 in a direction that approaches the pivoting axis A1, as well as in a direction that moves away therefrom. Here, the slot 10 is formed closer to the proximal-end side and the bottom side than the pivoting axis A1 is.

The wire 8 passes through in the interior of the body portion 2 in the longitudinal direction, with the distal-end portion thereof wound about half way around an outer circumferential surface on the distal-end side of the pulling pulley 7. The distal end of the wire 8 is secured to the body portion 2 farther on the proximal-end side than the pulling pulley 7 is, and the proximal end of the wire 8 is connected to the driving portion 4. In addition, a portion of the wire 8 that extends from the bottom end of the pulling pulley 7 toward the proximal-end side and a portion of the wire 8 that extends from the top end of the pulling pulley 7 toward the proximal-end side are disposed so as to be substantially parallel to each other.

The driving portion 4 has a motor (not shown) to which the proximal end of the wire 8 is connected and pulls the wire 8 to the proximal-end side by actuating the motor to generate tensile force in the wire 8.

Next, the operation of the thus-configured grasping mechanism 3 and grasping device 1 will be described below.

Figure 4:
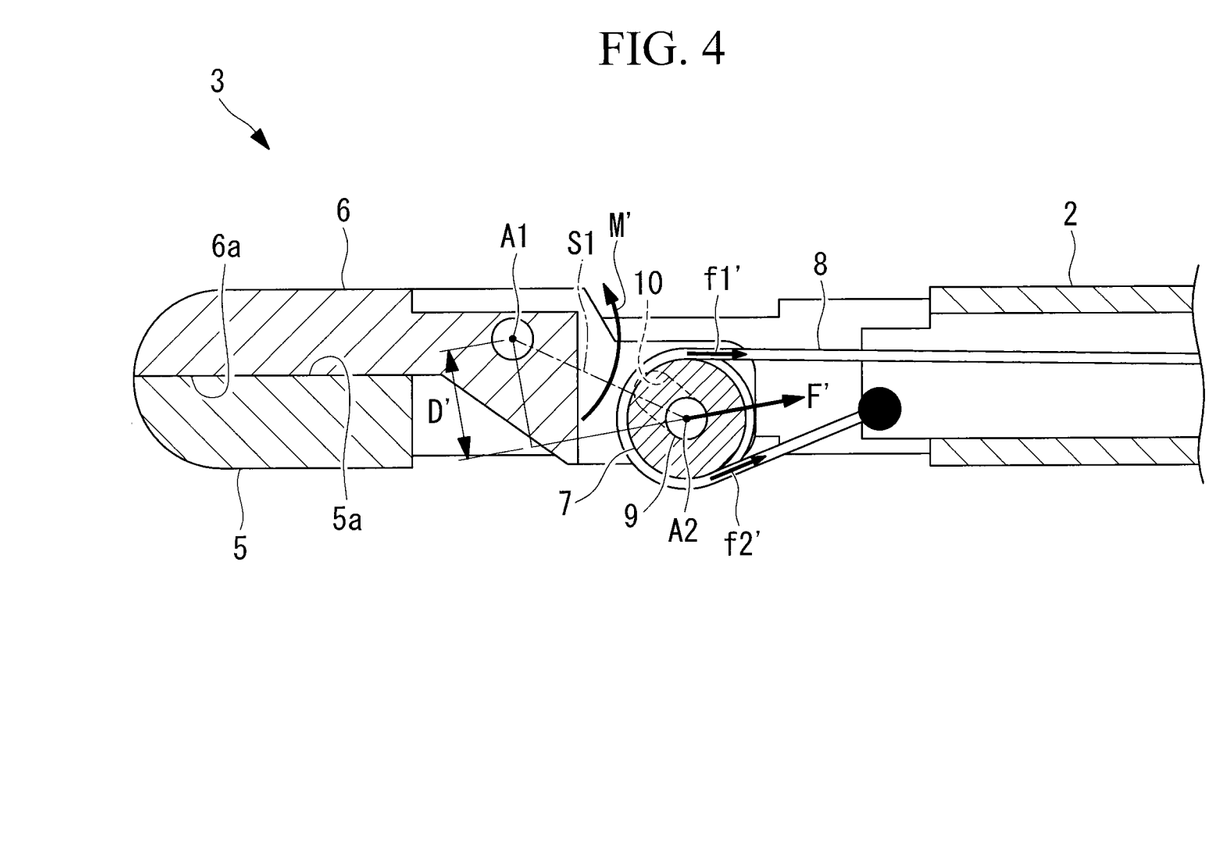
FIG. 4 is a longitudinal sectional view of the distal-end portion of the grasping device in FIG. 1, showing the grasping mechanism in the grasping state, and is a diagram for explaining the force generated in the wire when the pulling pulley is disposed at a position farthest from the pivoting axis.

With the grasping device 1 according to this embodiment, when the wire 8 is pulled toward the proximal-end side by actuating the driving portion 4, a rotational moment M' about the pivoting axis A1 in the closing direction acts on the second grasping piece 6, as shown in FIG. 4, and thus, the second grasping piece 6 is pressed against the first grasping piece 5 due to the rotational moment M'. By doing so, it is possible to generate a grasping force that grasps biological tissue (not shown) sandwiched between the first grasping surface 5a and the second grasping surface 6a.

Figure 3:
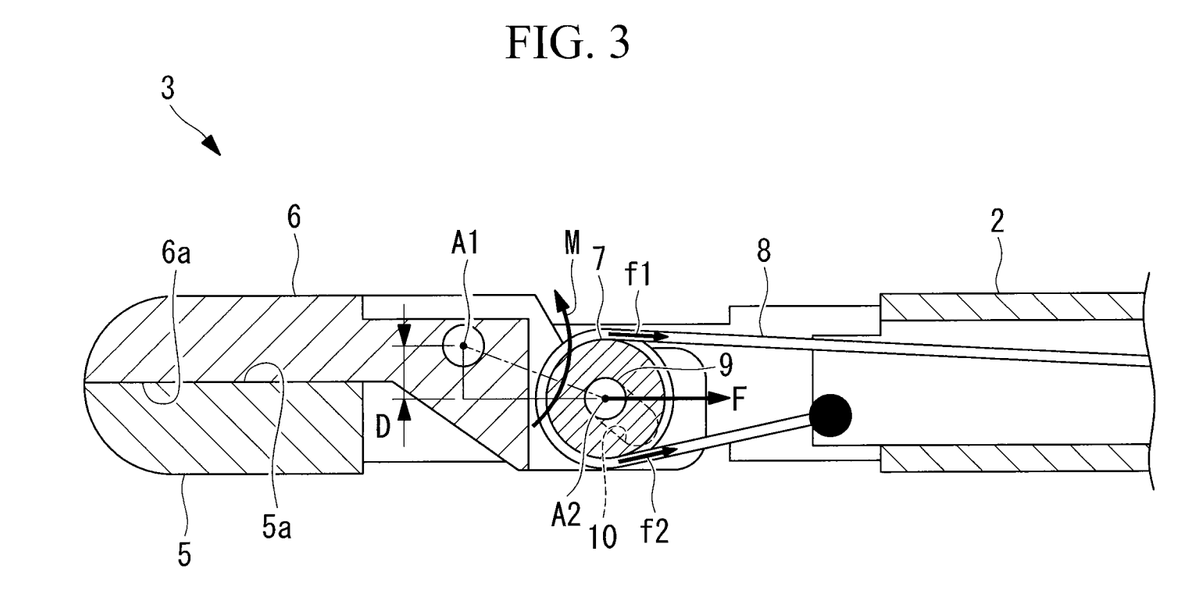
FIG. 3 is a diagram for explaining the force generated in a wire when a pulling pulley is disposed at a position closest to the pivoting axis.

In more detail, when the proximal end of the wire 8 is pulled by means of the driving portion 4, as shown in FIG. 3, tensile forces f1 and f2, which act in substantially the same directions toward the proximal-end side at magnitudes substantially equal to the pulling force that the driving portion 4 applies to the wire 8 on the proximal end thereof, are generated in the wire 8 on both the top and bottom sides of the pulling pulley 7. The pulling pulley 7 is pulled to the proximal-end side by a resultant force F=f1+f2 of the tensile force f1 and the tensile force f2 and is moved in the direction away from the pivoting axis A1 from the most distal-end-side position of the slot 10 to the most proximal-end-side position of the slot 10.

In the state in which the pulling pulley 7 has been moved to the most proximal-end side of the slot 10, as shown in FIG. 4, tensile forces f1' and f2', which act in substantially the same directions toward the proximal-end side, are generated in the wire 8 on both the top and bottom sides of the pulling pulley 7, a resultant force F'=f1'+f2' of the tensile force f1' and the tensile force f2' acts on the pulling pulley 7, and, in addition, the resultant force F' also acts on the second grasping piece 6 supporting the pulling pulley 7. Here, the resultant force F' that acts on the rotation axis A2 of the pulling pulley 7, positioned on the bottom side with respect to the pivoting axis A1, has a direction that intersects a line segment S1 connecting the pivoting axis A1 and the rotation axis A2. Therefore, the resultant force F' generates a component in the tangential direction about the pivoting axis A1, that is, the rotational moment M' that makes the second grasping piece 6 pivot about the pivoting axis A1 in the closing direction.

As has been described above, with this embodiment, the pulling pulley 7 constitutes a movable pulley that pulls the second grasping piece 6 toward the proximal-end side and transmits the pulling force applied to the wire 8 from the driving portion 4 to the second grasping piece 6 by amplifying the pulling force approximately twofold. By doing so, as compared with a configuration in which the second grasping piece 6 is pulled by using a single wire 8 that is disposed straight in the direction along the longitudinal axis of the body portion 2, there is an advantage in that it is possible to approximately double the generated rotational moment M', thus making it possible to increase the grasping forces exerted by the grasping pieces 5 and 6 approximately twofold.

Furthermore, the magnitude of the rotational moment M' generated by the resultant force F' is determined by the geometrical relationship between the pivoting axis A1 and the resultant force F, and is proportional to a distance D' between a straight line, which passes through the rotation axis A2 of the pulling pulley 7 and extends in the direction of the resultant force F', and the pivoting axis A1. In the grasping state, when the pulling pulley 7 is moved in the slot 10 from the distal-end side to the proximal-end side, the distance D' is increased as compared with a distance D in the closed state. By doing so, a greater rotational moment M' is achieved, and thus, there is an advantage in that it is possible to further increase the grasping force.

In addition, because the pivoting range of the second grasping piece 6 in the opening direction is not structurally restricted by the pulling pulley 7 and the wire 8, there is an advantage in that it is possible to ensure a large enough opening angle between the first grasping piece 5 and the second grasping piece 6.

In this embodiment, although the pulling pulley 7 is supported by the second grasping piece 6 so as to be movable in the direction that increases the distance D, alternatively, the pulling pulley 7 may be supported by the second grasping piece 6 so as to be rotatable at the same position without being moved.

By doing so also, the pulling force applied to the wire 8 due to the driving force can be amplified approximately twofold by the pulling pulley 7, and thus, the rotational moment and the grasping force that act on the second grasping piece 6 can be increased.

Figure 5:
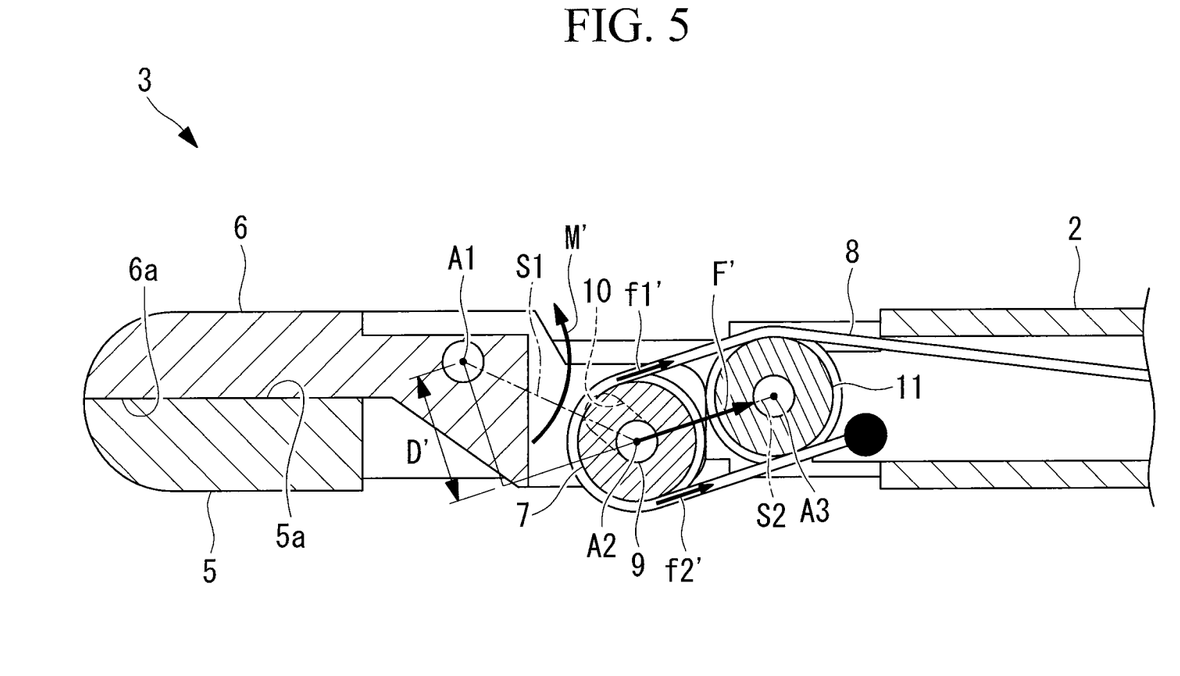
FIG. 5 is a longitudinal sectional view showing a modification of the grasping mechanism in FIG. 2.

In this embodiment, as shown in FIG. 5, the grasping mechanism 3 may be further provided with an adjusting pulley 11 that is provided on the proximal-end side of the pulling pulley 7 so as to be rotatable about a rotation axis A3 parallel to the rotation axis A2, and that adjust the direction of the wire 8 that extends from the top end of the pulling pulley 7 toward the proximal-end side. The adjusting pulley 11 is provided so as to change the direction of the resultant force F' to a direction that increases the distance D', that is, a direction that increases the rotational moment M'. By doing so, it is possible to further increase the rotational moment M' generated when the wire 8 is pulled by the same pulling force.

Specifically, the adjusting pulley 11 is provided farther on the top side than the pulling pulley 7 is so as to make an angle formed by the line segment S1 between the pivoting axis A1 and the rotation axis A2 and a line segment S2 between the rotation axis A2 and the rotation axis A3 closer to 90°, and the wire 8 extends from the top end of the pulling pulley 7 to the proximal-end side via the adjusting pulley 11. By doing so, an angle formed by a portion of the wire 8 between the top end of the pulling pulley 7 and the top end of the adjusting pulley 11 and the line segment S1 becomes closer to 90°, thus increasing the distance D'.

Figure 6:
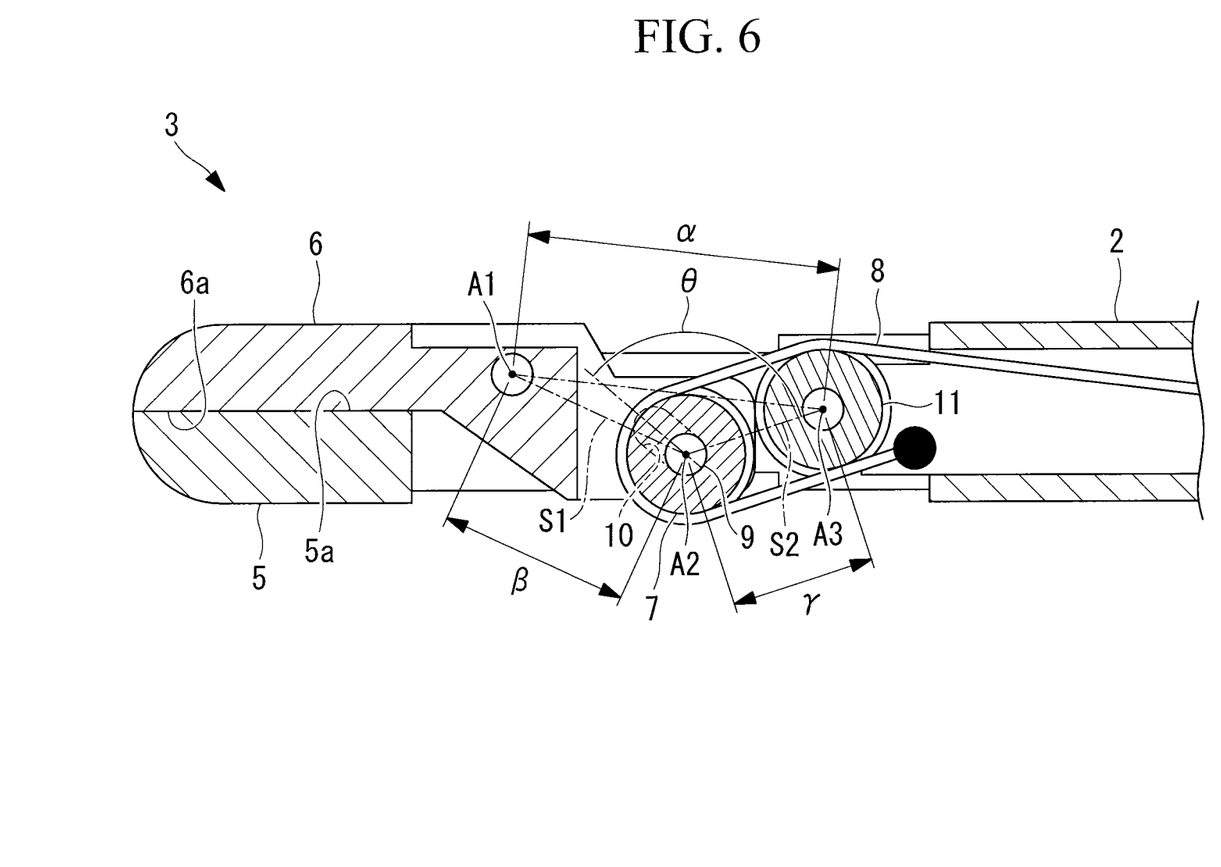
FIG. 6 is a diagram for explaining relational expressions (1) and (2) that express positional relationships between the pivoting axis of a second grasping piece of the grasping mechanism in FIG. 5, and the rotation axis of the pulling pulley and the rotation axis of the adjusting pulley.

As shown in FIG. 6, when the first grasping piece 5 and the second grasping piece 6 are arranged so as to be closed, the positional relationships among the pivoting axis A1, the rotation axis A2, and the rotation axis A3 in the grasping mechanism 3 in FIG. 5 satisfy the following relational expressions (1) and (2). Further, the direction in which the pulling pulley 7 is moved by the resultant force F and the positions of the rotation axis A2 and A3 satisfy the following relational expression (2). By satisfying the relational expressions (1) and (2), it is possible to reliably move the pulling pulley 7 in the slot 10 in the direction away from the pivoting axis A1 when the wire 8 is pulled, and thus, it is possible to stably exert a large grasping force. In the relational expressions (1) and (2), a is the distance between the pivoting axis A1 and the rotation axis A3 of the adjusting pulley 11, β is the distance between the pivoting axis A1 and the rotation axis A2 of the pulling pulley 7, and γ is the distance between the rotation axis A2 of the pulling pulley 7 and the rotation axis A3 of the adjusting pulley 11. In the relational expression (2), θ is the angle formed by the longitudinal direction of the slot 10 which is the direction in which the pulling pulley 7 is moved and the line segment connecting the rotation axis A2 of the pulling pulley 7 at a position farthest from the pivoting axis A1 and the rotation axis A3.

$$\alpha < \beta + \gamma \quad (1)$$

$$\theta > 90 \quad (2)$$

When α=β+γ, the pivoting axis A1, the rotation axis A2, and the rotation axis A3 are positioned on the same straight line. In the case of this arrangement, it is difficult to change the direction of the resultant force F' to the direction that increases the rotational moment M' by using the adjusting pulley 11.

In a case in which θ=90, the pulling pulley 7 is not moved in the slot 10. Therefore, the rotational moment M' does not increase. In a case in which θ<90, the pulling pulley 7 is moved along the slot 10 to approach the pivoting axis A1. Therefore, the rotational moment M' decreases.

Figure 7:
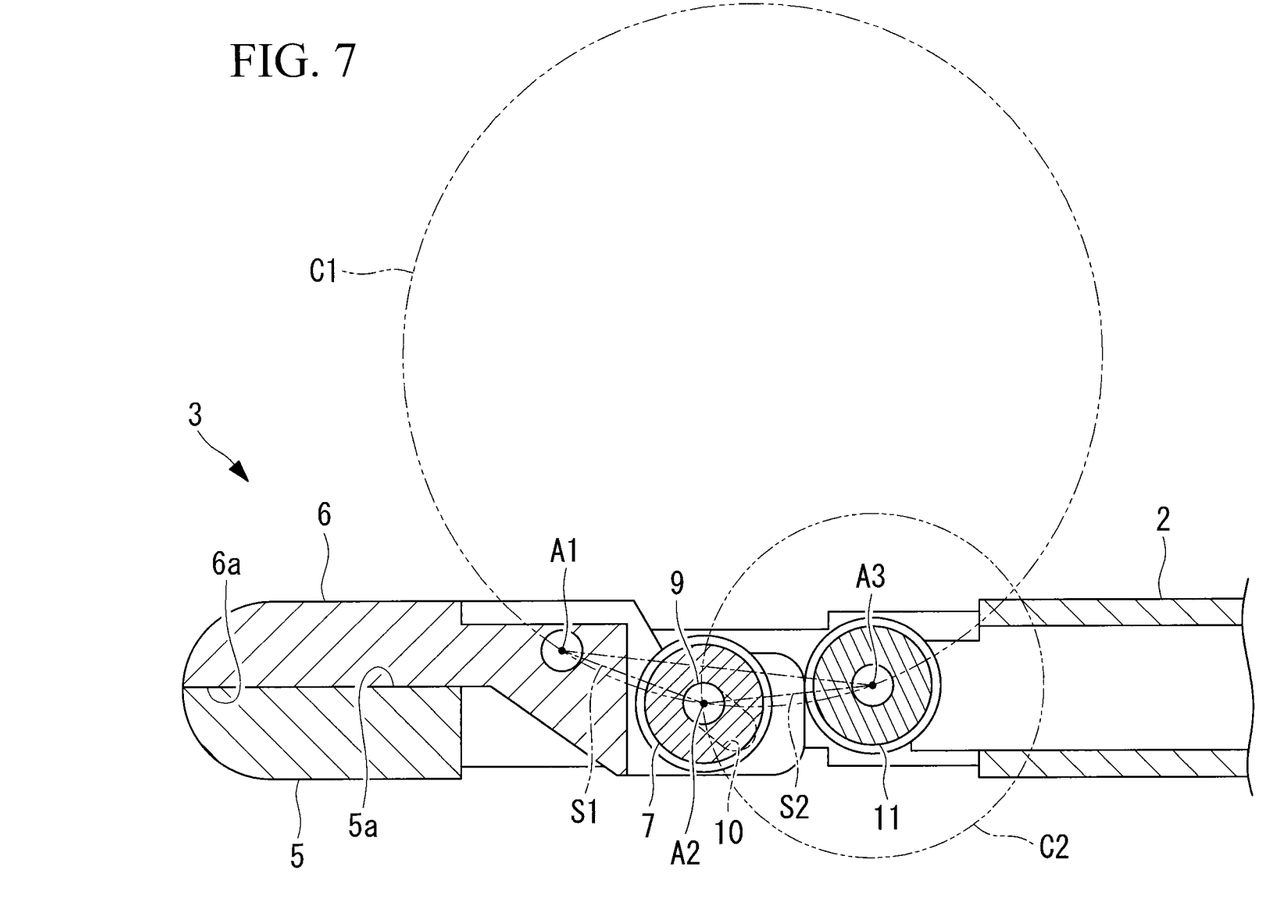
FIG. 7 is a diagram for explaining the direction in which the pulling pulley is moved in the grasping mechanism in FIG. 5.

Furthermore, in the grasping mechanism 3 in FIG. 5, the slot 10 is formed so that, when the wire 8 is pulled, the pulling pulley 7 is moved toward the outside of a first circle C1 and toward the inside of a second circle C2, as shown in FIG. 7. The first circle C1 is a circle that passes through the pivoting axis A1, the rotation axis A2 of the pulling pulley 7 when the rotation axis A2 is at the position closest to the pivoting axis A1, and the rotation axis A3 of the adjusting pulley 11. The second circle C2 is a circle whose center is the rotation axis A3 of the adjusting pulley 11, and that passes through the rotation axis A2 of the pulling pulley 7 when the rotation axis A2 is at the position closest to the pivoting axis A1. Here, the position of the rotation axis A2 is a position when the first grasping piece 5 and the second grasping piece 6 are arranged so as to be closed.

By doing so, when the wire 8 is pulled, the pulling pulley 7 is moved in the direction that increases the distance D, that is, the rotational moment M, and thus, it is possible to increase the grasping force.

Figure 8:
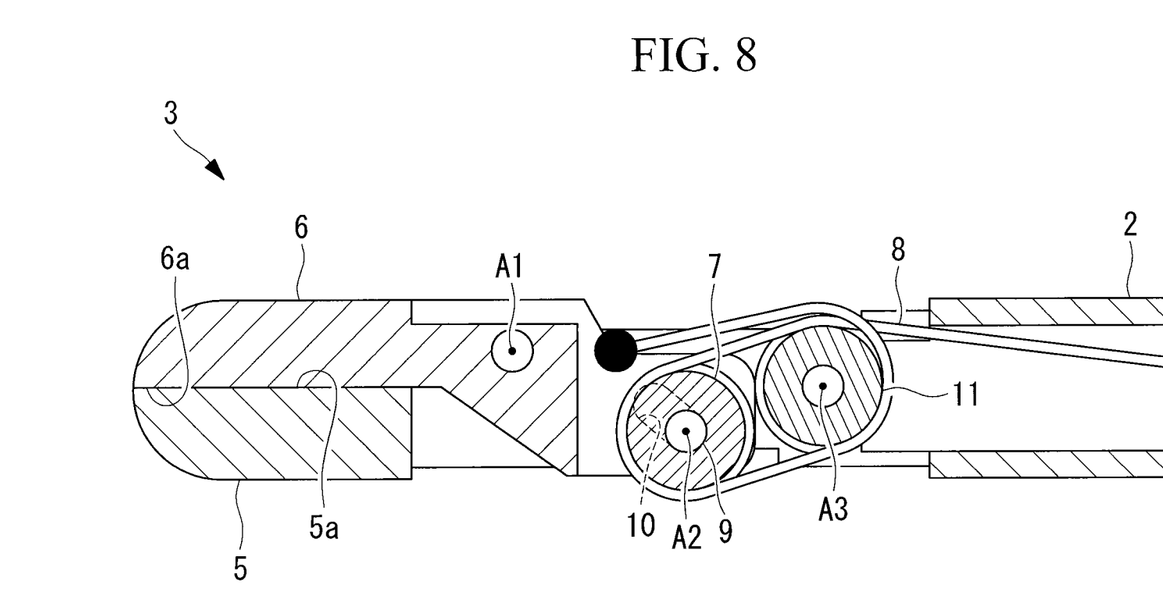
FIG. 8 is a longitudinal sectional view of another modification of the grasping mechanism in FIG. 2.
Figure 9:
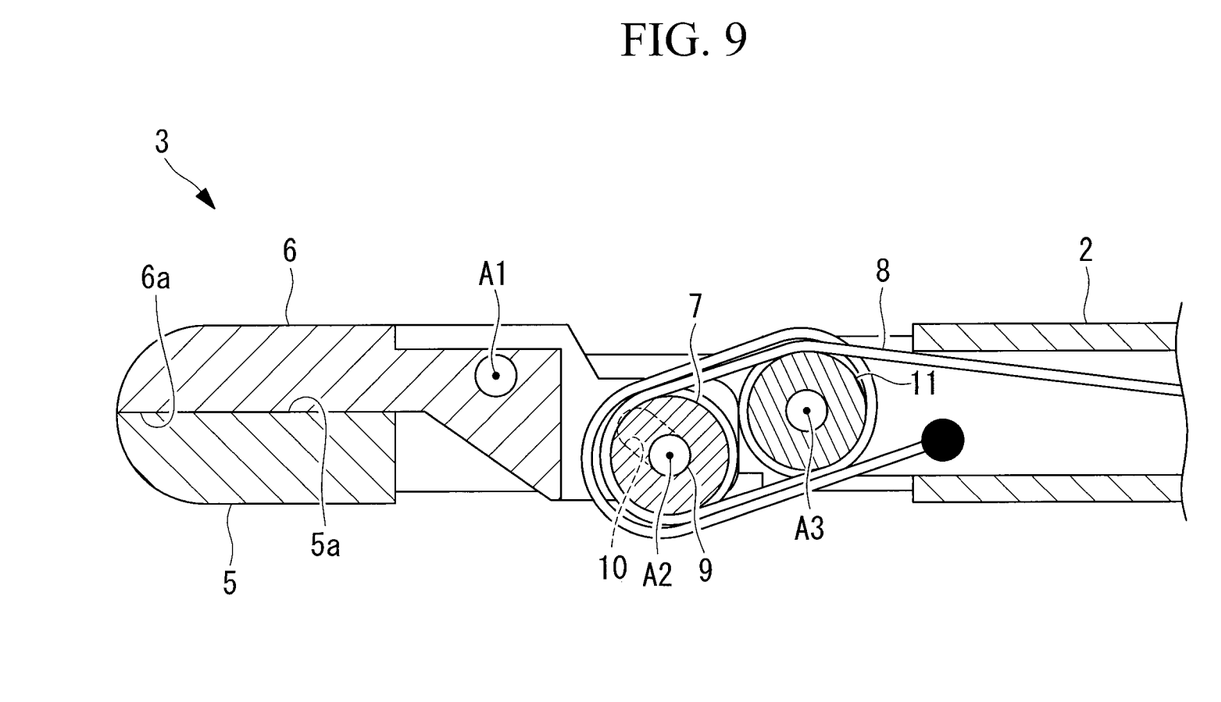
FIG. 9 is longitudinal sectional view of another modification of the grasping mechanism in FIG. 2.

In this embodiment, although the wire 8 is wound only about half way around the pulling pulley 7, alternatively, as shown in FIGS. 8 and 9, the wire 8 may be wound around the pulling pulley 7 and the adjusting pulley 11 once or more so as to surround the pulling pulley 7 and the adjusting pulley 11.

The magnitude of the pulling force that acts on the second grasping piece 6 is increased with an increase in the apparent number of wires 8 indirectly via the pulling pulley 7 or directly connected to the second grasping piece 6. Therefore, by increasing the number of times the wire 8 is wound between the pulling pulley 7 and the adjusting pulley 11, it is possible to further increase the grasping force by further amplifying the pulling force and the rotational moment M' that act on the second grasping piece 6.

For example, as shown in FIG. 8, in the case in which the distal end of the wire 8 is secured to the second grasping piece 6 and the distal-end portion of the wire 8 is wound around the pulling pulley 7 and the adjusting pulley 11 one and a half times, a rotational moment that is approximately 1.5 times greater than the case in FIG. 5 is achieved. As shown in FIG. 9, in the case in which the distal end of the wire 8 is secured to the body portion 2 and the distal-end portion of the wire 8 is wound around the pulling pulley 7 and the adjusting pulley 11 approximately twice, a rotational moment that is approximately two times greater than the case in FIG. 5 is achieved.

Figure 10:
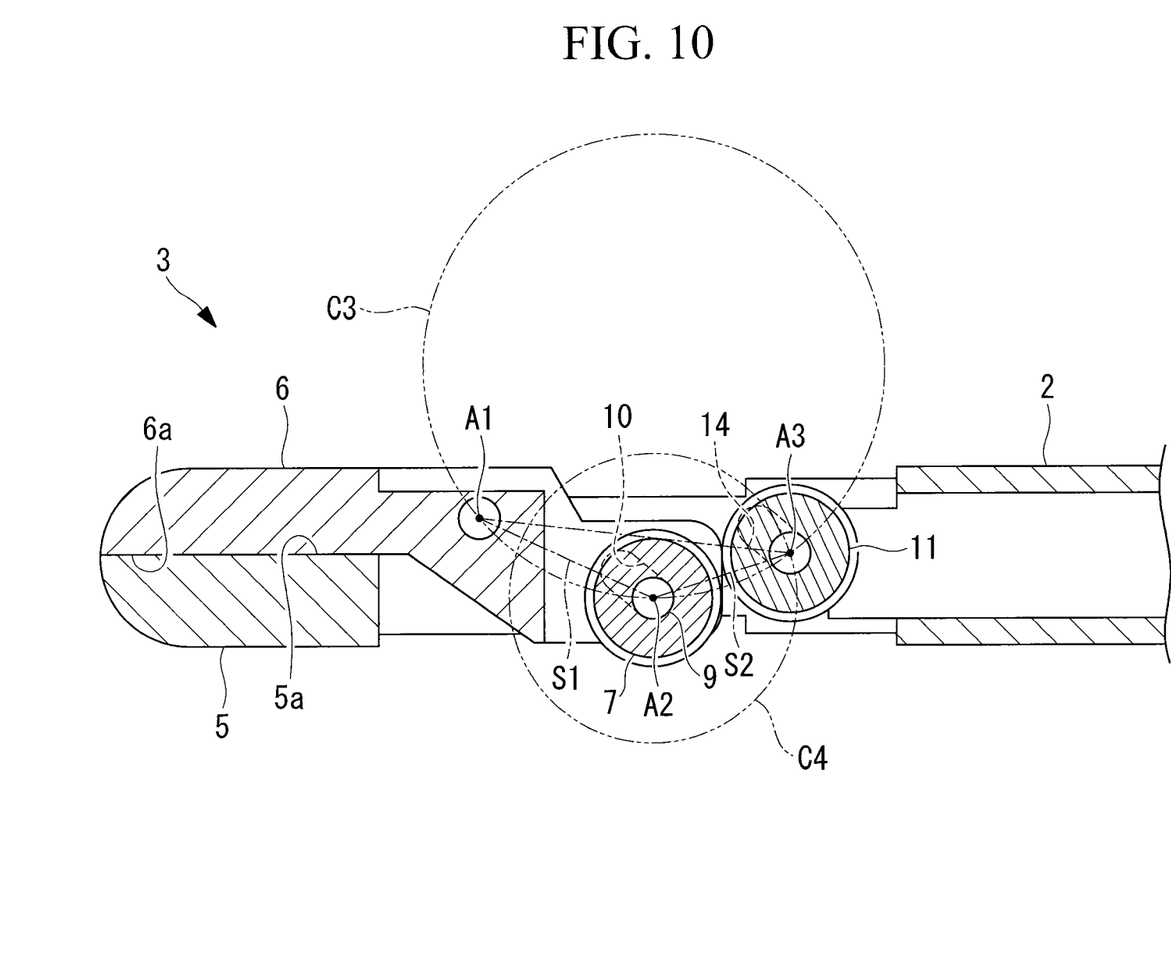
FIG. 10 is a diagram for explaining movement of an adjusting pulley in the modifications of the grasping mechanism in FIGS. 8 and 9.

In the grasping mechanism 3 in FIGS. 8 and 9, as shown in FIG. 10, the adjusting pulley 11 may be provided so as to be movable in the direction that approaches the pivoting axis A1 due to the tensile force in the wire 8 when the wire 8 is pulled. In FIG. 10, the wire 8 is omitted from the illustration.

In this case, a slot 14 that guides the rotation axis A3 of the adjusting pulley 11 is formed in the first grasping piece 5 so that the adjusting pulley 11 is moved toward the inside of a third circle C3 and toward the inside of a fourth circle C4 when the wire 8 is pulled. The third circle C3 is a circle that passes through the pivoting axis A1, the rotation axis A2 of the pulling pulley 7 when the rotation axis A2 is at the position farthest from the pivoting axis A1, and the rotation axis A3 of the adjusting pulley 11 when the rotation axis A3 is at the position farthest from the pivoting axis A1. The fourth circle C4 is a circle whose the center is the rotation axis A2 of the pulling pulley 7 when the rotation axis A2 is at the position farthest from the pivoting axis A1 and that passes through the rotation axis A3 of the adjusting pulley 11 when the rotation axis A3 is at the position farthest from the pivoting axis A1. Here, the position of the rotation axis A2 is a position when the first grasping piece 5 and the second grasping piece 6 are arranged so as to be closed.

By doing so, when the wire 8 is pulled, the adjusting pulley 11 is moved in a direction that makes the angle formed by the line segment S1 and the line segment S2 closer to 90°, and thus, the distance D' and the rotational moment M' are further increased. By doing so, it is possible to further increase the grasping force.

In this embodiment, although only the mechanism for generating the grasping force has been described, an arbitrary mechanism for pivoting the second grasping piece 6 in the opening direction can be provided in the pivoting mechanism.

Figure 11:
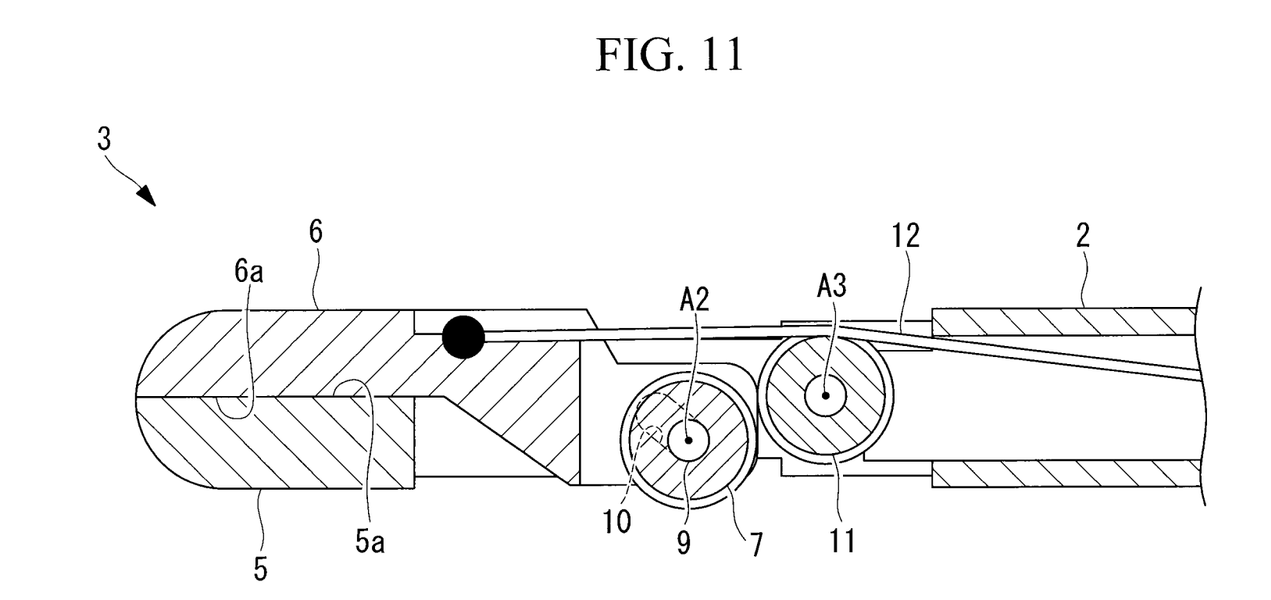
FIG. 11 is a longitudinal sectional view of the distal-end portion of the grasping device, showing an example of a wire for opening the grasping pieces.
Figure 12:
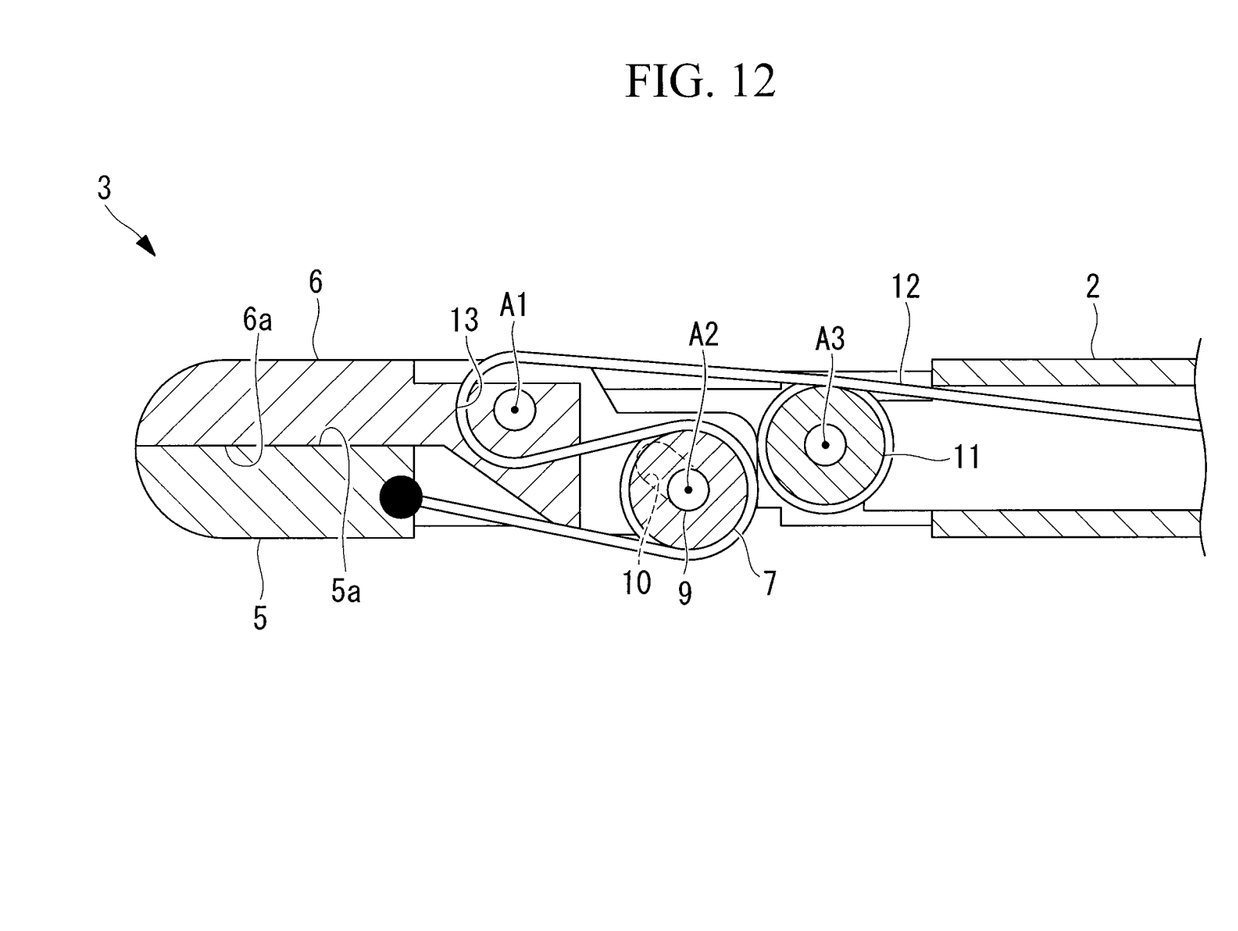
FIG. 12 is a longitudinal sectional view of the distal-end portion of the grasping device, showing another example of the wire for opening the grasping pieces.

For example, as shown in FIG. 11, there may be provided another wire 12 whose distal end is secured to the second grasping piece 6 farther on the top side and distal-end side than the pivoting axis A1 is and that extends substantially straight in the direction along the longitudinal axis of the body portion 2. It is possible to make a rotational moment in the opening direction act on the second grasping piece 6 by pulling the proximal end of the other wire 12. Alternatively, as shown in FIG. 12, the other wire 12 whose distal end is secured to the first grasping piece 5 may be placed so as to reach the proximal-end side, by passing through the interior of an arc-shaped groove 13 formed in the second grasping piece 6 centered on the pivoting axis A1, so that the rotational moment in the opening direction is amplified. In FIGS. 11 and 12, the wire 8 is omitted from the illustration.

Alternatively, an elastic member (not shown), such as a spring, that biases the second grasping piece 6 in the closing direction may be employed instead of the wire 12.

The above-described embodiment leads to the following inventions.

A first aspect of the present invention is a grasping mechanism including a first grasping piece; a second grasping piece that arranged side by side with the first grasping piece and that is coupled therewith so as to be pivotable about a pivoting axis that intersects the arrangement direction with respect to the first grasping piece so that first-end sides are opened and closed; a pulling pulley that is supported by the second grasping piece so as to be rotatable about a rotation axis that is parallel to the pivoting axis; and a wire that has a distal end secured to one of the first grasping piece and the second grasping piece and a proximal end that is disposed farther on a second-end side than the second grasping piece is, and whose distal-end portion is wound around the pulling pulley, wherein, the wire is wound around the pulling pulley so that tensile forces that act in substantially the same directions are generated in the wire on both sides of the pulling pulley flanking the rotation axis when the proximal end of the wire is pulled, and so that a resultant force of the tensile forces that act on the rotation axis of the pulling pulley generates a rotational moment about the pivoting axis in the closing direction of the second grasping piece.

With the first aspect of the present invention, when the pulling force is applied to the proximal end of the wire, the pulling force is transmitted to the pulling pulley around which the wire is wound and the second grasping piece supporting the pulling pulley; a component of the pulling force in a tangential direction about the pivoting axis of the second grasping piece acts on the second grasping piece in the form of the rotational moment in the closing direction, and thus, the first-end portion of the second grasping piece is pressed against the first-end portion of the first grasping piece. By doing so, it is possible to generate a grasping force on an object sandwiched between the first-end portion of the first grasping piece and the first-end portion of the second grasping piece.

In this case, when the pulling force is applied to the proximal end of the wire whose distal end is secured, tensile forces that act in substantially the same directions are generated in the wire on both sides flanking the rotation axis of the pulling pulley, and the resultant force of these two tensile forces acts on the pulling pulley. In other words, the pulling force applied to the proximal end of the wire acts on the pulling pulley and the second grasping piece after being amplified approximately twofold. By doing so, it is possible to increase the grasping force. In addition, because the pivoting angle of the second grasping piece in the opening direction with respect to the first grasping piece is not structurally restricted, it is possible to ensure a large enough opening angle between the first grasping piece and the second grasping piece.

In the above-described first aspect, the pulling pulley may be supported by the second grasping piece so as to be movable due to the tensile force in the wire in a direction that increases a distance between a straight line, which passes through the rotation axis and extends in the direction of the resultant force, and the pivoting axis.

By doing so, because the magnitude of the rotational moment generated by the resultant force is proportional to the distance between the straight line, which passes through the rotation axis of the pulling pulley and extends in the direction of the resultant force, and the pivoting axis, by moving the pulling pulley in the direction that increases this distance, the rotational moment in the closing direction that acts on the second grasping piece is further amplified, and thus, it is possible to further increase the grasping force.

The above-described first aspect may be provided with an adjusting pulley that is supported by the first grasping piece farther on the second-end side than the pulling pulley is so as to be rotatable about a rotation axis parallel to the pivoting axis, and that, by having the wire extending toward the second-end side from the pulling pulley wound therearound, changes the direction of the wire extending toward the second-end side from the pulling pulley to a direction that increases a distance between a straight line, which passes through the rotation axis of the pulling pulley and extends in the direction of the resultant force, and the pivoting axis.

By doing so, by adjusting the direction of the resultant force, by the adjusting pulley, in the direction that increases the distance between the straight line, which passes through the rotation axis of the pulling pulley and extends in the direction of the resultant force, and the pivoting axis, the rotational moment in the closing direction that acts on the second grasping piece is further amplified, and thus, it is possible to further increase the grasping force.

The above-described first aspect may be provided with an adjusting pulley that is supported by the first grasping piece farther on the second-end side than the pulling pulley is so as to be rotatable about a rotation axis parallel to the pivoting axis, and that, by having the wire extending toward the second-end side from the pulling pulley wound therearound, changes the direction of the wire extending toward the second-end side from the pulling pulley to a direction that increases the distance between the straight line, which passes through the rotation axis of the pulling pulley and extends in the direction of the resultant force, and the pivoting axis, wherein the following relational expressions may be satisfied. In the following relational expressions, a is the distance between the pivoting axis and the rotation axis of the adjusting pulley, $\beta$ is the distance between the pivoting axis and the rotation axis of the pulling pulley, $\gamma$ is the distance between the rotation axis of the pulling pulley and the rotation axis of the adjusting pulley, and $\theta$ is the angle formed by the line segment connecting the rotation axis of the adjusting pulley and the rotation axis of the pulling pulley at a position farthest from the pivoting axis and the direction in which the pulling pulley is moved.

$$\alpha < \beta + \gamma$$

$$\theta > 90$$

By doing so, the direction in which the pulling pulley is moved when the wire is pulled is stabilized in a constant direction, and thus, it is possible to stably generate a large grasping force.

In the above-described first aspect, the pulling pulley may be supported by the second grasping piece so as to be movable toward the outside of a circle that passes through the rotation axis of the pulling pulley when the rotation axis is at a position closest to the pivoting axis, the pivoting axis, and the rotation axis of the adjusting pulley, and toward the inside of a circle whose center is the rotation axis of the adjusting pulley and that passes through the rotation axis of the pulling pulley when the rotation axis is at a position closest to the pivoting axis.

By doing so, when the wire is pulled, the pulling pulley is moved in the direction that increases the distance between the straight line, which passes through the rotation axis of the pulling pulley and extends in the direction of the resultant force, and the pivoting axis, which further amplifies the rotational moment in the closing direction that acts on the second grasping piece, and thus, it is possible to further increase the grasping force.

In the above-described first aspect, the wire may be wound around once or more so as to surround the pulling pulley and the adjusting pulley.

By doing so, the pulling force applied to the proximal end of the wire is further amplified and transmitted to the pulling pulley and the second grasping piece, and thus, it is possible to further increase the rotational moment and the grasping force.

In the above-described first aspect, the adjusting pulley maybe supported by the first grasping piece so as to be movable, due to the tensile forces in the wire, toward the inside of a circle that passes through the rotation axis of the adjusting pulley when the rotation axis is at a position farthest from the pivoting axis, the rotation axis of the pulling pulley, and the pivoting axis, and toward the inside of a circle whose center is the rotation axis of the pulling pulley and that passes through the rotation axis of the adjusting pulley.

By doing so, when the wire is pulled, the adjusting pulley is moved in the direction that increases the distance between the straight line, which passes through the rotation axis of the pulling pulley and extends in the direction of the resultant force, and the pivoting axis, which further amplifies the rotational moment in the closing direction that acts on the second grasping piece, and thus, it is possible to further increase the grasping force.

A second aspect of the present invention is a grasping device provided with any one of the above-described grasping mechanisms and a driving portion that is provided on the second-end side of the grasping mechanism and that pulls the proximal end of the wire.

REFERENCE SIGNS LIST 1 grasping device
3 grasping mechanism
4 driving portion
5 first grasping piece
6 second grasping piece
7 pulling pulley
8 wire
11 adjusting pulley
A1 pivoting axis
A2, A3 rotation axis

The invention claimed is:
1. A grasping device comprising:
a body portion;
a grasping mechanism arranged at one end of the body portion,
the grasping mechanism comprising:
a first grasping piece, and
a second grasping piece pivotably coupled with the first grasping piece by a pivot such that one end of the second grasping piece is opened and closed with respect to the first grasping piece about a pivoting axis, the second grasping piece having a slot formed so as to be offset proximally from the pivot and to extend proximally towards a proximal end;
a pulley comprising a shaft extending parallel to the pivoting axis the shaft being slidably disposed in the slot such that the pulley moves along the slot distally towards the pivot and proximally towards the proximal end; and
a wire wound around the pulley, one portion of the wire being secured to the body portion at a fixing position, the fixing position being arranged to be proximal to the first grasping piece and the second grasping piece, the shaft of the pulley being between the fixing position and the pivot in the longitudinal direction, and an other portion of the wire extending proximally so as to be pulled in a proximal direction towards the proximal end;
wherein the shaft of the pulley is provided at a position that makes the pulley move in the slot towards the proximal end when the other portion of the wire is pulled such that the pulley generates a rotational moment that makes the second grasping piece pivot in the closing direction about the pivoting axis to close the second grasping piece with respect to the first grasping piece.

2. The grasping device according to claim 1, wherein when the grasping mechanism is in a closed state and the pulley receives a pulling force by the other portion of the wire, the pulley is configured to be moved in a direction that increases a distance between the pivoting axis and a straight line extending in a direction of a force that acts on a rotation axis of the pulley.

3. The grasping device according to claim 1, wherein when the grasping mechanism is in a closed state and the pulley receives a pulling force by the other portion of the wire, the pulley is configured to be moved to a position that increases the rotational moment that makes the second grasping piece pivot in the closing direction.

* * * * *